(12) United States Patent
Agapiou et al.

(10) Patent No.: US 10,491,085 B2
(45) Date of Patent: Nov. 26, 2019

(54) INDUCTION ROTOR AND METHOD OF ASSEMBLING AN INDUCTION ROTOR

(71) Applicant: GM GLOBAL TECHNOLOGY OPERATIONS LLC, Detroit, MI (US)

(72) Inventors: John S. Agapiou, Rochester Hills, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 399 days.

(21) Appl. No.: 15/254,834

(22) Filed: Sep. 1, 2016

(65) Prior Publication Data

US 2018/0062486 A1 Mar. 1, 2018

(51) Int. Cl.
| | |
|---|---|
| H02K 15/00 | (2006.01) |
| H02K 1/26 | (2006.01) |
| H02K 3/12 | (2006.01) |
| H02K 17/20 | (2006.01) |

(52) U.S. Cl.
CPC ......... *H02K 15/0012* (2013.01); *H02K 1/26* (2013.01); *H02K 3/12* (2013.01); *H02K 17/205* (2013.01)

(58) Field of Classification Search
CPC ............ H02K 15/00; H02K 1/26; H02K 3/12; H02K 17/205; H02K 15/0012
USPC .......................... 310/216.114, 400, 406, 407
See application file for complete search history.

(56) References Cited

U.S. PATENT DOCUMENTS

| | | | | |
|---|---|---|---|---|
| 2004/0113508 | A1* | 6/2004 | Yasuhara | H02K 15/0012 310/211 |
| 2007/0062026 | A1* | 3/2007 | Pizzichil | H02K 15/0012 29/596 |
| 2011/0062819 | A1* | 3/2011 | Lyons | H02K 15/0012 310/261.1 |
| 2013/0020899 | A1* | 1/2013 | Kleber | H02K 15/0012 310/211 |
| 2013/0049518 | A1* | 2/2013 | Kleber | H02K 15/0012 310/211 |
| 2013/0127291 | A1 | 5/2013 | Agapiou et al. | |
| 2014/0021811 | A1* | 1/2014 | Hamer | H02K 9/22 310/52 |
| 2014/0084713 | A1* | 3/2014 | Kurahara | H02K 3/30 310/45 |
| 2015/0288265 | A1* | 10/2015 | Hanna | H02K 17/165 310/211 |
| 2016/0197539 | A1* | 7/2016 | Agapiou | H02K 17/165 310/211 |

* cited by examiner

*Primary Examiner* — Naishadh N Desai
(74) *Attorney, Agent, or Firm* — Reising Ethington P.C.

(57) ABSTRACT

A rotor for an electromagnetic machine and a method of assembling the rotor are provided. In one embodiment, the rotor includes a lamination stack disposed about a rotational axis a plurality of conductor bars disposed within corresponding slots formed in the lamination stack and extending beyond the longitudinal ends of the lamination stack. End rings are positioned at either end of the lamination stack and define a plurality of openings configured to receive the ends of the conductor bars. Each end ring includes separate inner and outer concentric rings. The inner and outer rings define radially outer and inner surfaces configured to about one another and each of the concentric rings defines a portion of each conductor bar opening in the end ring.

8 Claims, 5 Drawing Sheets

INDUCTION ROTOR AND METHOD OF ASSEMBLING AN INDUCTION ROTOR

FIELD

The present disclosure relates generally to electromagnetic machines. More specifically, the disclosure relates to a rotor for an electromagnetic machine and to a method of assembling the rotor.

BACKGROUND

Electromagnetic machines such as electric motors and generators are useful in converting one form of energy to another form of energy (e.g., converting electrical energy to mechanical energy or converting mechanical energy to electrical energy). A typical electromagnetic machine may include a stationary component, or stator, and a rotating component, or rotor, that rotates relative to the stator. The relative rotation of the two components results in energy conversion.

One example of an electromagnetic machine is an alternating current (AC) induction motor. In an AC induction motor, current flow in conductors supported on the stator produces a rotating magnetic field. The magnetic field induces a current in closed loop conductors in the rotor resulting in a magnetic force that causes the rotor to rotate relative to the stator. In a typical AC induction motor, the closed loop conductor is commonly called a squirrel cage and includes a plurality of conductor bars extending parallel to or at a skew angle relative to the rotational axis of the rotor and rings disposed at either end of the bars and rotor and electrically coupling the bars together. The formation of the rotor, and particularly the squirrel cage, has a significant impact on the performance and cost of the machine.

SUMMARY

According to one embodiment, there is provided a rotor for an electromagnetic machine. The rotor includes a lamination stack disposed about a rotational axis and having first and second ends. The lamination stack includes a plurality of adjacent laminations defining a plurality of slots extending between the first and second ends. The rotor further includes a plurality of conductor bars. Each conductor bar of the plurality of conductor bars is disposed within a corresponding slot of the plurality of slots and extends beyond the first and second ends of the lamination stack. The rotor further includes first and second end rings disposed at the first and second ends of the lamination stack. Each of the first and second end rings defines a plurality of openings and each opening of the plurality of openings is configured to receive a corresponding conductor bar of the plurality of conductor bars. Each of the first and second end rings includes separate inner and outer concentric rings. The inner concentric ring defines a radially outer surface and a first portion of each opening of the plurality of openings. The outer concentric ring defines a radially inner surface and second portion of each opening of the plurality of openings. The radially outer surface of the inner concentric ring is configured to abut the radially inner surface of the outer concentric ring.

According to another embodiment, there is provided a method for assembling a rotor for an electromagnetic machine. The method includes stacking a plurality of laminations together to form a lamination stack. The lamination stack is disposed about a rotational axis and has first and second ends and defining a plurality of slots extending between the first and second ends. The method further includes inserting each conductor bar of a plurality of conductor bars into a corresponding slot in the plurality of slots such that each conductor bar extends beyond the first and second ends of the lamination stack. The method further includes positioning separate inner and outer concentric rings of a first end ring at the first end of the lamination stack over a first end of each of the plurality of conductor bars. The first end ring defines a plurality of openings and each opening of the plurality of openings is configured to receive a corresponding conductor bar of the plurality of conductor bars. The inner concentric ring defines a radially outer surface and a first portion of each opening of the plurality of openings and the outer concentric ring defines a radially inner surface and second portion of each opening of the plurality of openings. The radially outer surface of the inner concentric ring is configured to abut the radially inner surface of the outer concentric ring. The method further includes joining the inner and outer concentric rings of the first end ring to one another and to each of the plurality of conductor bars.

DRAWINGS

Preferred exemplary embodiments will hereinafter be described in conjunction with the appended drawings, wherein like designations denote like elements, and wherein.

DESCRIPTION

A rotor for an electromagnetic machine as described herein includes end rings disposed at either end of the rotor that define openings configured to receive the ends of conducting bars extending along the rotor. The end rings are separated into inner and outer concentric rings with each of the inner and outer concentric rings defining a portion of each opening. During assembly, the inner and outer rings are joined together along with the conducting bars. The rotor and method of assembling the rotor described herein provide a number of advantages. For example, the openings in the end rings can be formed with relatively narrow tolerances relative to the conducting bars thereby facilitating the use of certain joining processes and producing stronger joints. The end rings can also be formed using relatively low cost and precise manufacturing processes. The structure and method of assembling the rotor also facilitate the use of copper in the end rings and conductor bars to provide greater power density and heat transfer.

Figure 1:
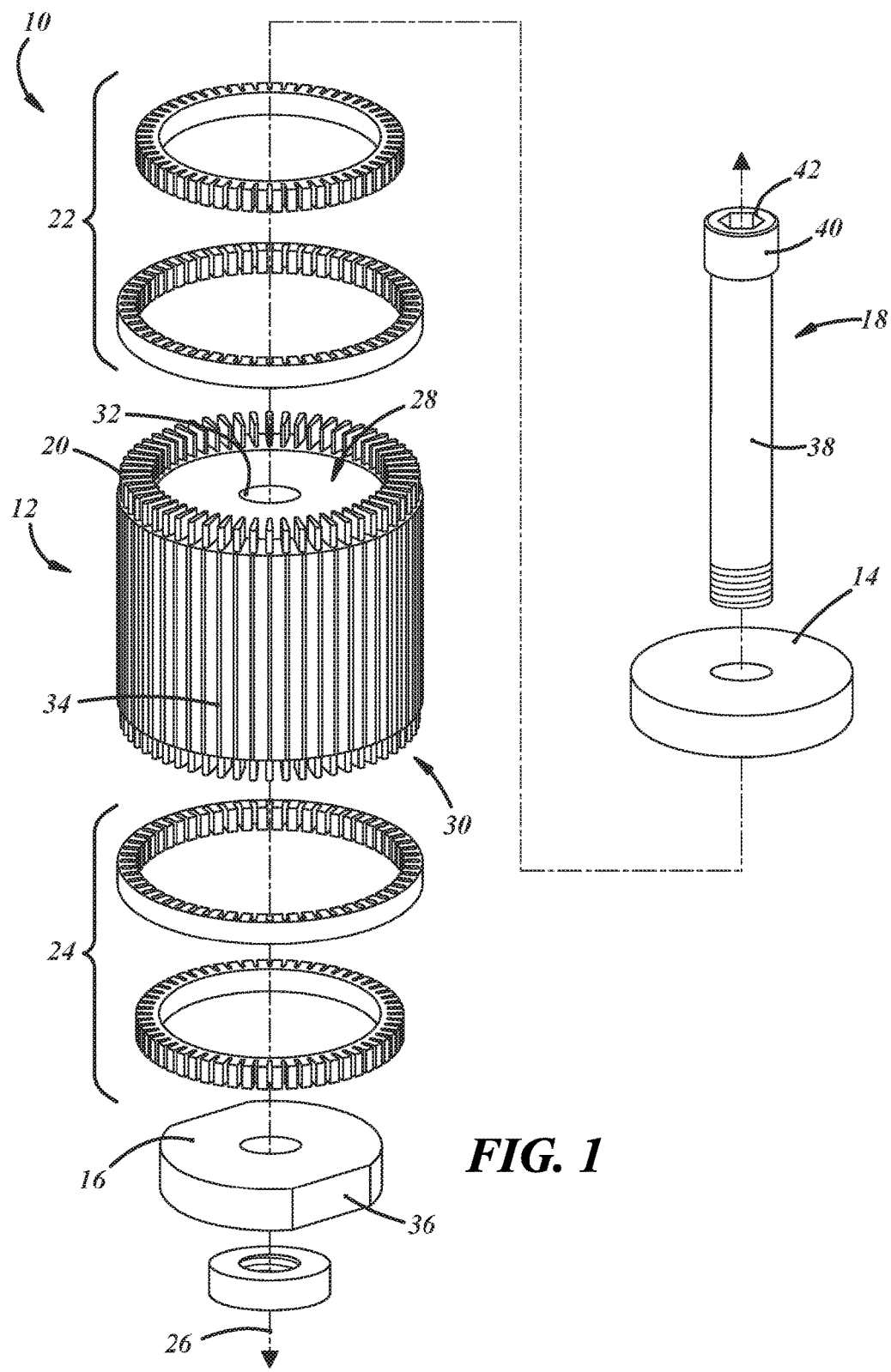
FIG. 1 is an exploded view of one embodiment of a rotor for an electromagnetic machine.

Referring now to the drawings wherein like reference numerals are used to identify identical components in the various views, FIG. 1 illustrates one embodiment of a rotor 10 for an electromagnetic machine. In the illustrated embodiment, rotor 10 is configured for use in AC induction motor and, in particular, for an AC induction motor used in a vehicle. It should be understood, however, that rotor 10 may find use in other electromagnetic machines and non-vehicular applications. Rotor 10 may include a lamination stack 12, retainers 14, 16, a fastener 18, and a squirrel cage including a plurality of conductor bars 20 and end rings 22, 24.

Figure 3:
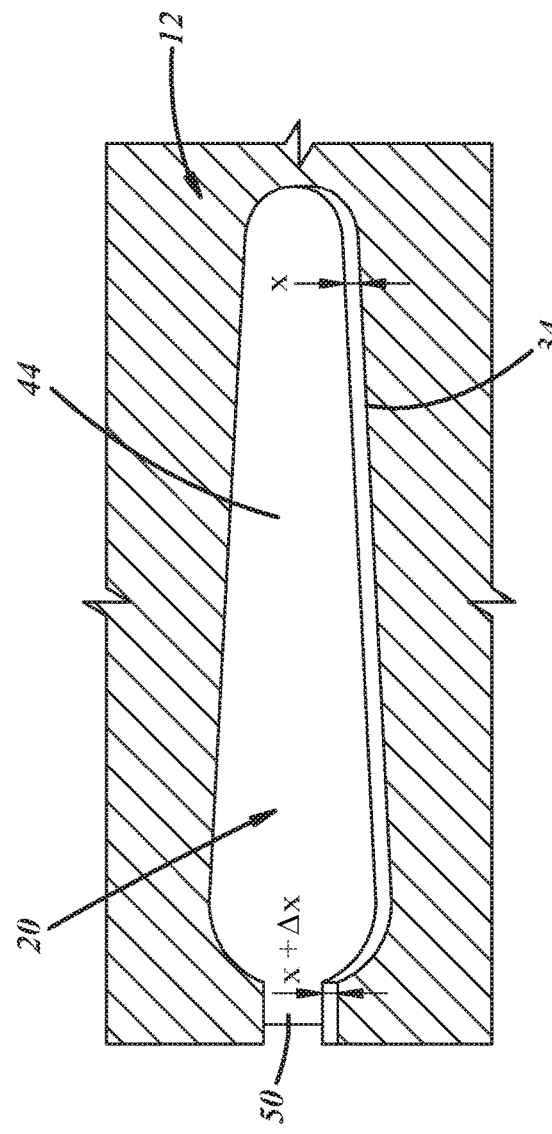
FIG. 3 is a cross-sectional view of the conductor bar of FIG. 2 within a lamination of the lamination stack of the rotor of FIG. 1 prior to skewing of the lamination stack and conductor bars.

Lamination stack 12 includes a plurality of individual laminations having the same or substantially the same shape that are stacked adjacent to one another to form stack 12. The laminations may be made from steel and, in particular, silicon steel. The stack 12 is disposed about a rotational axis 26 and has opposed axial ends 28, 30. Each lamination, and the lamination stack 12, defines a central bore 32 that may be disposed about, and centered about, axis 26. The bore 32 extends through the stack 12 from end 28 to end 30 and is configured to receive a rotor shaft (not shown). In use, rotor 10—including stack 12—rotate on the shaft such that axis 26 is substantially coincident with the rotational axis of the shaft. Each lamination further defines a plurality of recesses disposed about the radially outer periphery of the lamination or stack 12. The recesses may be evenly distributed circumferentially about the laminations and may extend from a radially outer surface of the lamination to a point intermediate the radially inner and outer surfaces of the lamination. During assembly, the laminations are arranged such that the recesses in each lamination are aligned to form slots 34 that extend from end 28 to end 30 of stack 12 and are configured to receive conductor bars 20. Referring to FIG. 3, in the illustrated embodiment, and moving radially inwardly, slots 34 have a constant relatively narrow width near the radially outer surface of the lamination or stack 12 and then widen to a maximum width before constantly narrowing to a radially inner most point of the slot 34. It should be understood, however, that the shape of the slots 34 is intended to complement the shape of conductor bars 20 and may vary. In some embodiments, stack 12 may include from about 30 to about 100 slots, but it should be understood that the exact number will vary depending on the application.

Retainers 14, 16 and fastener 18 are provided to position and orient the lamination stack 12 and conductor bars 20. Retainers 14, 16 may be disposed at opposite ends of stack 12 with each retainer 14, 16 disposed on one side of a corresponding end ring 22, 24, respectively. Retainers 14, 16 may be annular in shape and define central bores disposed about, and centered about axis 26 and configured to receive fastener 18. Retainer 16 may defined a plurality of threads on a radially inner surface configured to engage corresponding threads in fastener 18. Retainer 16 may also define a pair of opposed flats 36 on a radially outer surface to allow retainer 16 to be grasped by a tool and rotated relative to axis 26. Fastener 18 includes a shank 38 configured to be received within the aligned bores in retainers 14, 16 end rings 22, 24 and lamination stack 12. A distal portion of shank 38 may include a plurality of threads configured to engage the threads in retainer 16. Although fastener 18 is fastened to retainer 16 using mating threads in the illustrated embodiment, it should be understood that alternative fastening interfaces may be used. Fastener 18 also defines a head 40 extending from the proximal portion of shank 38. Head 40 may define a distal surface configured to abut against a surface of retainer 14 upon assembly of rotor 10. Head 40 may include an adjustment interface, such as hexagonal recess 42, configured to allow rotation of fastener 18 through the use of a conventional tool. Relative rotation of fastener 18 and retainer 16 adjusts the level of force applied to the stack 12 in order to allow alignment of the laminations in the stack, maintain the position of the stack, and/or enable the laminations in stack 12 to rotate relative to one another in order to skew slots 34, and therefore bars 20, relative to axis 26.

Figure 2:
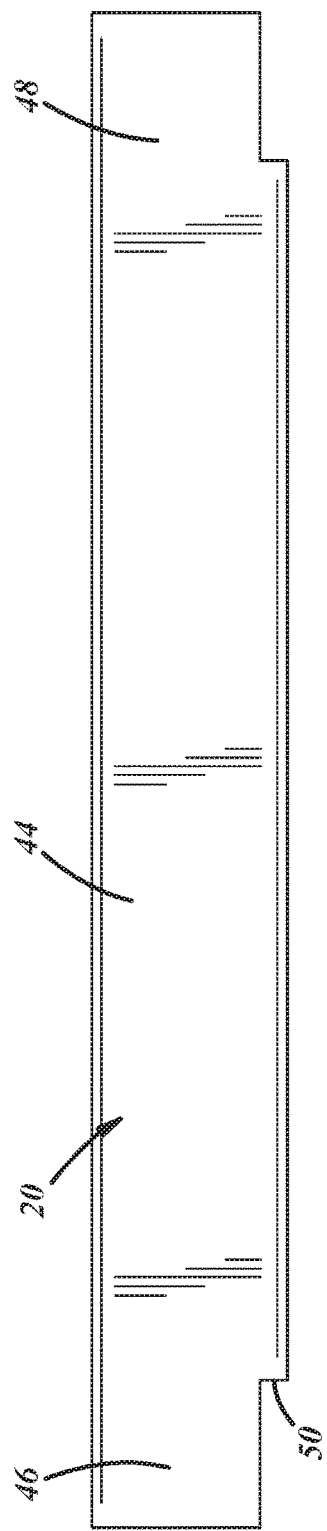
FIG. 2 is a side view of a conductor bar of the rotor of FIG. 1.

Conductor bars 20 are provided to conduct electric current during operation of an electromagnetic machine incorporating rotor 10. Bars 20 may be made from an electrically conductive material such as copper, a copper alloy such as a copper nickel alloy or copper boron alloy, aluminum, or an aluminum alloy. Referring to FIGS. 2-3, bars 20 include an intermediate portion 44 and end portions 46, 48. In the illustrated embodiment, intermediate portion 44 has a different shape or profile than end portions 46, 48. In other embodiments, portions 44, 46, 48 may have a uniform shape or profile. Intermediate portion 44 is configured to be received with a corresponding slot 34 in stack 12 and may directly about the surface of the lamination stack 12 (as opposed to being separated therefrom by a coating, resin or other separator). End portions 46, 48 may extend beyond the axial ends 28, 30 of stack 12 depending on the design of rotor 10. Referring to FIG. 3, the thickness of each bar 20 may vary along the radial length of the bar 20. In the illustrated embodiment, the thickness continually decreases from a point proximate a radially outer portion of the bar 20 to the radially innermost point of the bar 20. The bar 20 is also curved proximate its radially outer and inner ends. Intermediate portion 44 may further include a rectilinear tab 50 that extends along the entire axial length of portion 44 and extends radially outwardly from the remainder of bar 20. As shown in FIG. 3, slots 34 in stack 12 are contoured to the cross-sectional shape of conductor bars 20 and to provide a clearance gap x between the rotor slot 34 and the conductor bar 20 along the radial length of the conductor bar 20. In the example shown, the clearance gap x is of a constant width along the tapered portion of the conductor bar 20. Slot 34 may further define a tab slot which opens to the periphery of the lamination stack 12 to receive the tab 50 during insertion of the conductor bar 20 into the slot 34 (alternatively, slot 34 may be closed and the tab slot eliminated when intermediate portion 44 of bar 20 does not include tab 50). The tab slot is configured to provide a clearance gap $x+\Delta x$ between the tab 50 and the tab slot, where $x+\Delta x$ is greater than x. In one example, $\Delta x=0.005$ mm. The clearance gaps x and $x+\Delta x$ allow for insertion of the conductor bar 20 through the slot 34. Further, the width x of the clearance gap is configured such that after skewing of the stack 12, the clearance gap x between the conductor bar 20 and each slot 34 is closed such that the opposing sides of the conductor bar 20 are each in contact with adjacent surfaces of the laminations defining the slot 34, and such that the interference between the skewed laminations and skewed conductor bars 20 constrains axial and radial movement of the conductor bars 20 in the skewed stack 12.

Figure 6:
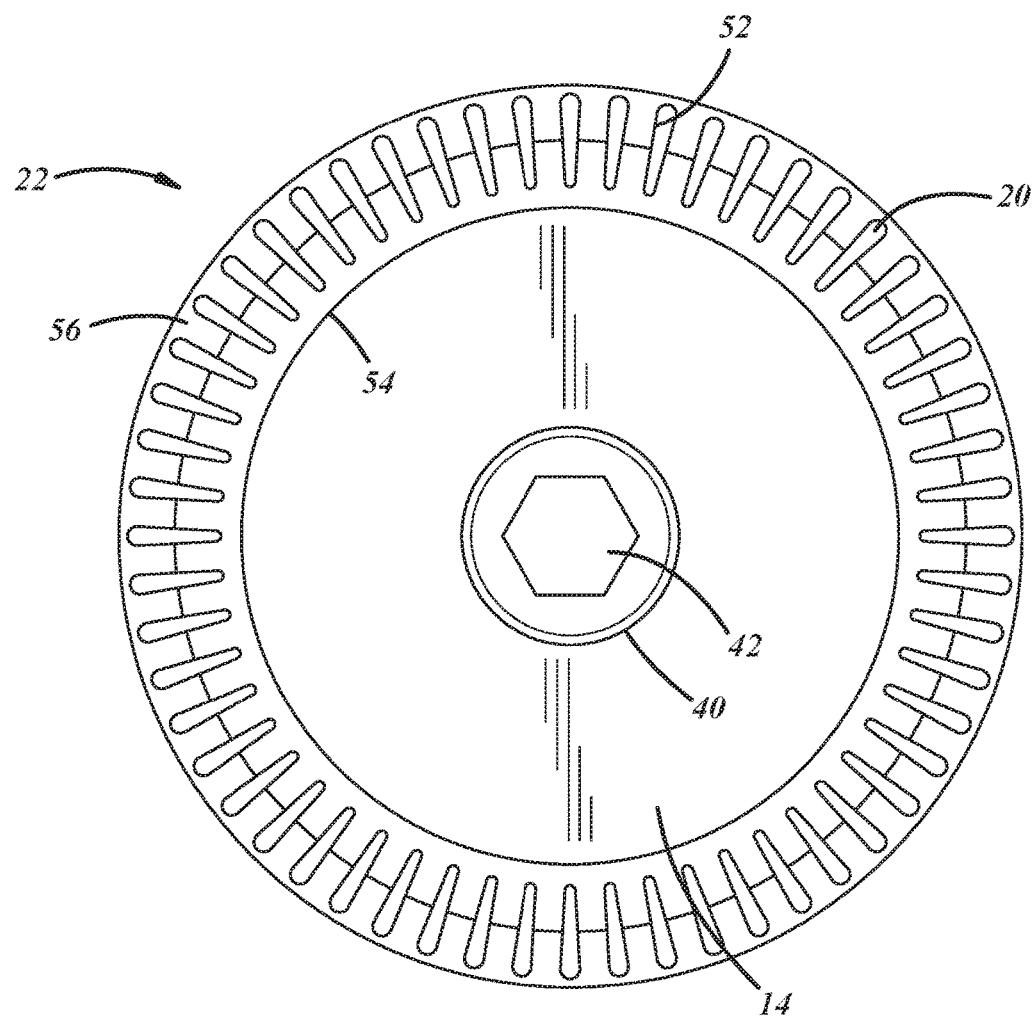
FIG. 6 is an end view of the rotor of FIG. 1.

End rings 22, 24 or shorting rings provide a means for coupling conductor bars 20 to provide a current bath for conduction of electrical current through conductor bars 20. End rings 22, 24 are made from an electrically conductive material such as copper or aluminum such that, when connected to the ends of bars 20, the rings electrically connect the bars 20 to allow current to be conducted through the bars 20. Referring to FIG. 6, each end ring 22, 24 defines a plurality of openings 52 extending through the end ring 22, 24 in a direction parallel to axis 26. The openings 52 may be equally spaced circumferentially about the end rings 22, 24 and may be equal in number to the number of conductor bars 20. The openings 52 have a shape that is complementary to the shape of a corresponding end portion 46, 48 of a conductor bar 20 and are configured to receive the end portion 46, 48 of the conductor bar 20. As discussed above, end portions 46, 48 of conductor bar 20 differ in shape or profile relative to intermediate portion 44 in the illustrated embodiment. In some embodiments, however, end portions 46, 48 may have the same shape or profile as intermediate portion 44 and, in particular, tab 50 may extend along the entire length of bar 20. In these embodiments, openings 52 may have substantially the same shape or profile as slot 34 in lamination stack 12.

Figure 5:
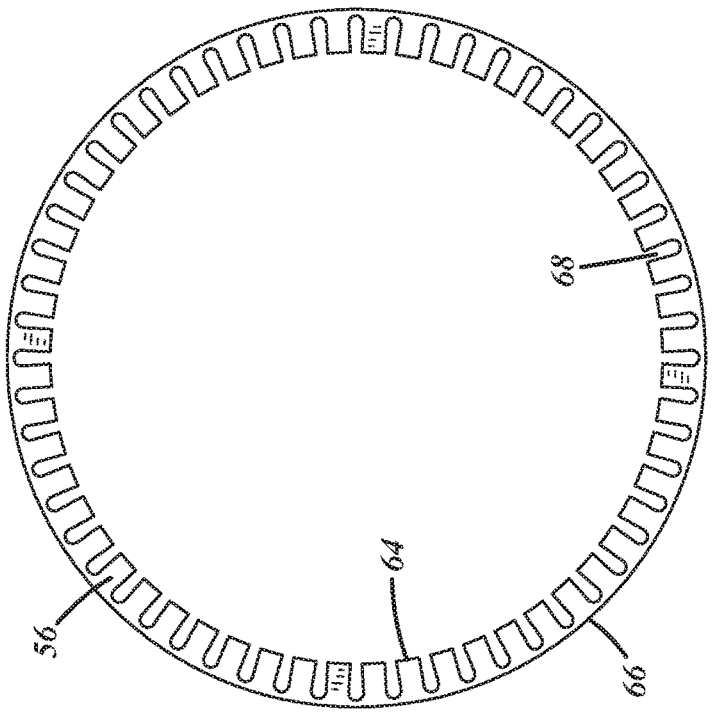
FIGS. 4-5 are side views of inner and outer concentric rings of an end ring of the rotor of FIG. 1.
Figure 4:
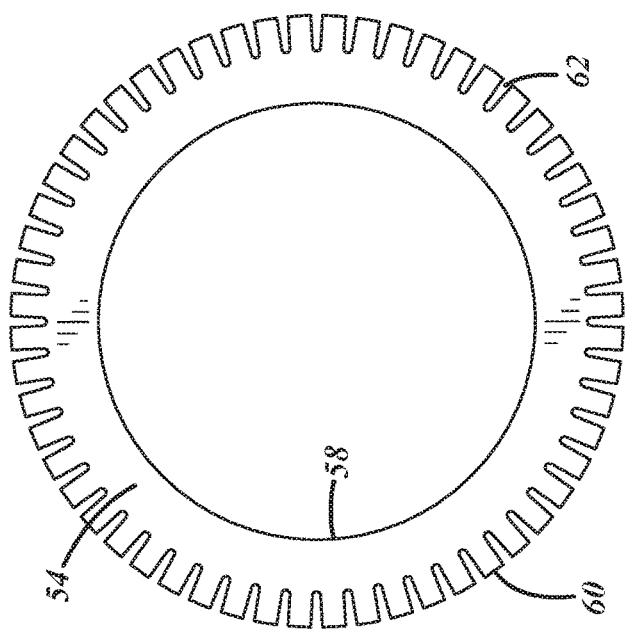

Referring to FIGS. 4-6, in accordance with one aspect of the present teachings, each end ring 22, 24 includes separate inner and outer concentric rings 54, 56 that are joined together during assembly of rotor 10. Inner ring 54 is annular in shape and configured to be disposed about, and centered about, axis 26 upon assembly of rotor 10. Inner ring 54 defines a radially inner surface 58 and a radially outer surface 60. Inner ring 54 further defines a portion 62 of each opening 52. The portion 62 is formed in the radially outer periphery of inner ring 54 and extends to a point intermediate the radially outer and inner peripheries of inner ring 54. Outer ring 56 is also annular in shape and configured to be disposed about, and centered about, axis 26 upon assembly of rotor 10. Outer ring 56 defines a radially inner surface 64 and a radially outer surface 66. Inner surface 64 is configured to abut outer surface 60 of inner ring 54 upon assembly of end ring 22 or 24 such that the inner and outer rings 54, 56 join along a substantially circular joint. Outer surface 66 may have substantially the same diameter as the radially outer perimeter of lamination stack 12. In embodiments where bar 20 has a uniform shape or profile along its length and end portions 46, 48 of conductor bar 20 include tab 50, outer surface 66 may initially have a larger diameter than the radially outer perimeter of lamination stack 12 and the diameter may be reduced through machining, shearing or broaching processes following assembly of rotor 10. Outer ring 56 further defines another portion 68 of each opening 52. Portion 68 is formed in the radially inner periphery of outer ring 56 and extends to a point intermediate the radially inner and outer peripheries of outer ring 56. The portions 62, 68 of a particular opening 52 in inner and outer rings 54, 56, may each comprise about one half of the opening 52. It should be understood, however, that the size of each portion 62, 68 of opening 52 formed in the inner or outer ring 54, 56, respectively, may vary and may be greater or less than one half of the size of the opening 52.

The construction of end rings 22, 24 as described herein provides several advantages relative to the construction of conventional rotors. Because the end rings 22, 24 are split into inner and outer concentric rings 54, 56 and portions 62, 68 of each conductor bar opening 52 are formed in each concentric ring 54, 56 and open to a perimeter of the ring 54, 56, the openings 52 can be formed in the end rings 22, 24 by broaching or similar processes that are more precise, more efficient and less expensive than conventional methods for forming the conductor bar openings. By using more precise forming methods, the openings 52 can be formed with relatively narrow tolerances thereby facilitating the formation of strong joints and conductivity between the end rings 22, 24 and conductor bars 20. Further, the narrow openings 52 (e.g., 1-2 millimeters in width with a perimeter that may be more than 15 times as large) can be formed through a relatively thick end ring (e.g., 8-12 millimeters in rotors for electromagnetic machines used in automotive applications) and without having to form the end rings 22, 24 from thinner laminations therefore improving conductivity and reducing manufacturing costs. This construction also facilitates the use of copper for the end rings 22, 24 (although aluminum can also be used) and formation of the end rings 22, 24 as wrought members rather than through die casting as in many conventional rotor assemblies thereby enabling greater conductivity and heat transfer.

Figure 7:
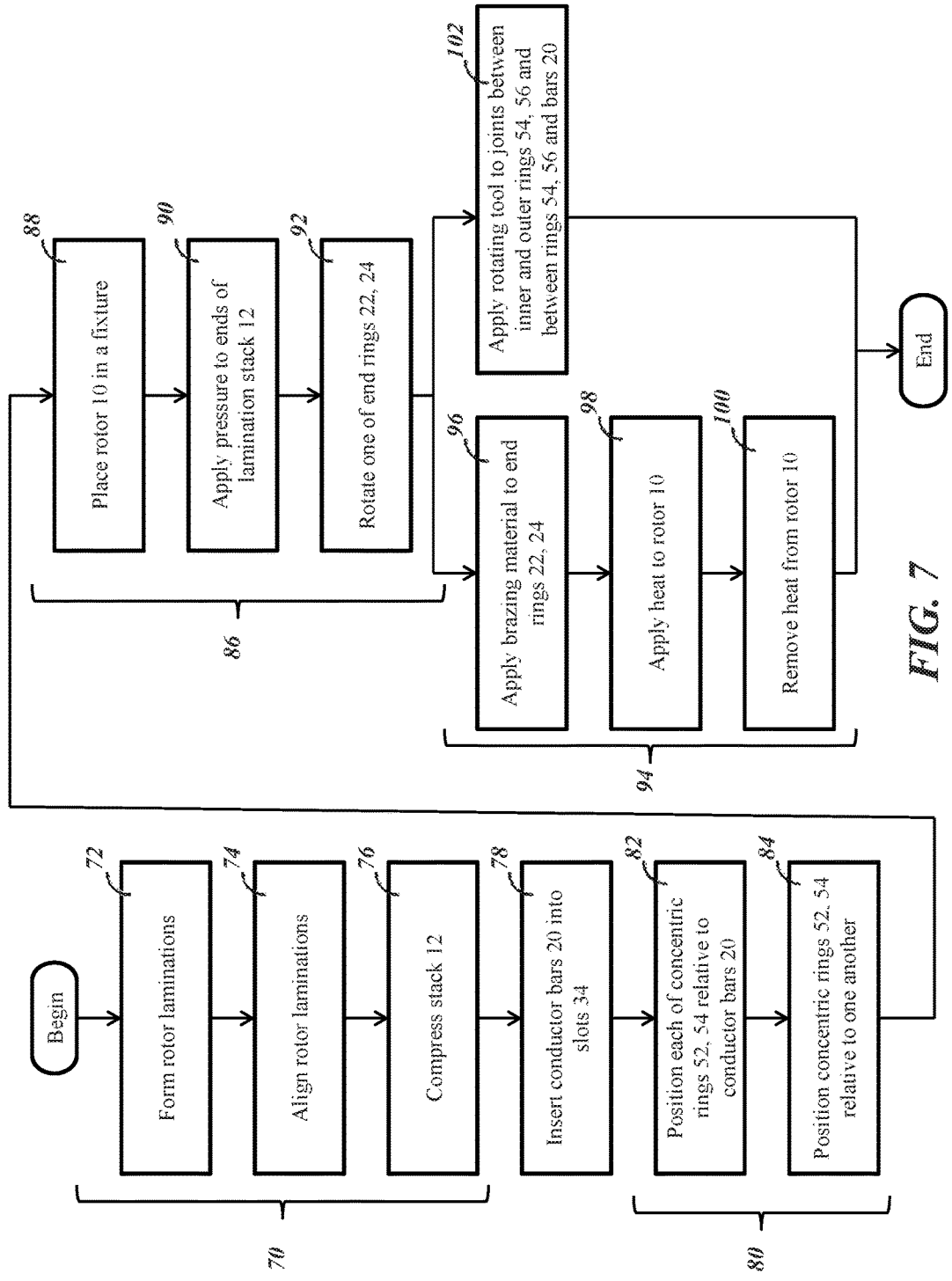
FIG. 7 is a flowchart diagram of one embodiment of a method of assembling a rotor for an electromagnetic machine.

Referring now to FIG. 7, a method of assembling a rotor 10 for an electromagnetic machine is illustrated. The method may begin with the step 70 of forming lamination stack 12. Step 70 may include the sub steps 72, 74 of forming the individual laminations (e.g., through stamping and machining) and stacking the laminations together to form the stack 12. The stacking substep 74 may include aligning the laminations by movement along and about axis 26 to align the openings formed the central bore 32 and conductor bar slots 34. The laminations may be stacked onto a mandrel such as shank 38 of fastener 18. Step 70 may further include the sub step 76 of pressing the stack 12 together with a compressive force to compress the stack 12.

The method may continue with the step 78 of inserting the conductor bars 20 into corresponding slots 34 in the lamination stack 12. Step 78 may include the substep of aligning the bars 20 such that the end portions 46, 48 of each bar extend beyond the ends 28, 30 of stack 12 and, further such that the length of the bars 20, extending beyond each end 28, 30 of the stack 12 are about equal. Bars 20 may be inserted into slots 34 by hand or by an automated process or machine.

The method may continue with the step 80 of positioning the inner and outer concentric rings 54, 56 of each end ring 22, 24 at opposite ends 28, 30 of the stack 12 over the corresponding end portions 46, 48 of the conductor bars 20. Step 80 may include the substep 82 of aligning each of the concentric rings 54, 56 with the conductor bars 20 such that the respective portions 62, 68 of the openings 52 are in line with corresponding conductor bars 20. Step 80 may further include the substep 84 of aligning the rings 54, 56 with one another such that the radially outer surface 60 of inner ring 54 and the radially inner surface 64 of outer ring 56 are axially aligned and abut one another and the portions 62, 68 of the openings 52 are circumferentially aligned. In some embodiments, one of the inner and outer rings 54, 56 of an end ring 22, 24 may be positioned over the conductor bars 20 before the other of the inner and outer rings 54, 56 such that substep 82 will proceed substep 84. In other embodiments, the inner and outer rings 54, 56 of an end ring 22, 24 may be positioned over the bars 20 simultaneously such that substep 84 may proceed substep 82.

The method may continue with the step 86 of skewing the lamination stack 12 and conductor bars 20 relative to axis 26 if required by the design of rotor 10. Skewing the conductor bars 20 relative to axis 26 insures appropriate current flow through bars 20. Skewing displaces the laminations in stack 20 radially relative to one another and skews the laminations and conductor bars relative to axis 26 by a predetermined skew angle. Step 86 may include the substep 88 of placing rotor 10 in a manually or automatically operated fixture (not shown). Step 86 may further include the sub step 90 of applying a predetermined pressure to both axial ends 28, 30 of lamination stack 12. Step 86 may further include the sub step 92 of rotating one of end rings 22, 24 at a predetermined angle relative to axis 26 while holding the other end ring 22, 24 stationary in the fixture. For example, the fixture may engage the flats 36 formed on retainer 16 to hold retainer 16 and end ring 24 stationary while a tool engages head 40 of fastener 18 through recess 42 in fastener 18 in order to cause rotation of fastener 18 and end ring 22. After the stack 12 and bars 20 are skewed, a retaining force may be applied on stack 12 to prevent axial and radial movement of the laminations relative to one another.

The method may continue with the step 94 of joining the inner and outer concentric rings 54, 56 of each end ring 22, 24 to one another and to the end portions 46, 48 of the conductor bars 20. In one embodiment, step 94 may be performed through a brazing process. This process may include a substep 96 of applying a brazing or filler material to end rings 22, 24 such as copper-phosphorous alloys, copper-phosphorous alloys including silver, copper-phosphorous alloys including near-eutectic silver, copper-phosphorous alloys including tin, aluminum-silicon alloys and combinations thereof. In particular, brazing material may be applied to one axial side of inner and outer concentric rings 54, 56 of each end ring 22, 24, particularly in the regions where the inner and outer concentric rings 54, 56 abut one another and where the inner and outer rings 54, 56 surround the conductor bars 20. The brazing material may be provided in a paste or powder form or as a sheet overlaid on the surface of rings 22, 24. The process may further include the substep 98 of applying heat to the rotor 10 to increase the temperature of the brazing material to above a melting temperature in order to melt the brazing material and cause the material to flow into the joints between inner and outer concentric rings 54, 56 and between the inner and outer concentric rings 54, 56 and the conductor bars 20. The process may further include the sub step 100 of removing the heat and/or cooling the rotor 10 to decrease the temperature of the brazing material to a point below the melting temperature so that the material assumes a fixed state. The brazing material may therefore begin in an initial state as a paste, powder, or sheet and then transition to a flowable state in the presence of the applied heat before reaching a fixed state after the heat is removed wherein the rings 22, 24 and bars 20 are brazed to one another. As will be understood by those in the art, additional substeps conventional to brazing processes may also be performed including application of flux or placement in a controlled atmospheric environment to prevent or reduce oxidation.

In another embodiment, step 94 may be performed through a solid state welding or fusion welding process. In one embodiment, the welding occurs through a friction stir welding process. This process may include a substep 102 of applying a rotating tool to the joints between the inner and outer concentric rings 54, 56 of each end ring 22, 24 and to the joints between the inner and outer concentric rings 54, 56 and the conductor bars 20 in order to soften the regions of each structure near the joint and intermix the materials forming the structures to join the structures. The fixture (not shown) used for performing step 94 could also be used to perform step 86 discussed above. As an alternative to friction stir welding, electron beam welding may be employed to join the inner and outer concentric rings 54, 56 of each end ring 22, 24 to one another and to the end portions 46, 48 of the conductor bars 20.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for assembling a rotor for an electromagnetic machine, comprising the steps of:
    stacking a plurality of laminations together to form a lamination stack, the lamination stack disposed about a rotational axis and having first and second ends and defining a plurality of slots extending between the first and second ends;
    inserting each conductor bar of a plurality of conductor bars into a corresponding slot in the plurality of slots such that each conductor bar extends beyond the first and second ends of the lamination stack;
    positioning separate inner and outer concentric rings of a first end ring at the first end of the lamination stack over a first end of each of the plurality of conductor bars, the first end ring defining a plurality of openings and each opening of the plurality of openings configured to receive a corresponding conductor bar of the plurality of conductor bars, the inner concentric ring defining a radially outer surface and a first portion of each opening of the plurality of openings and the outer concentric ring defining a radially inner surface and a second portion of each opening of the plurality of openings, the radially outer surface of the inner concentric ring abutting the radially inner surface of the outer concentric ring, and wherein the first portion of each opening of the plurality of openings extends radially inwardly into the inner concentric ring from the radially outer surface, and the second portion of each opening of the plurality of openings extends radially outwardly into the outer concentric ring from the radially inner surface; and
    joining the inner and outer concentric rings of the first end ring to one another and to each of the plurality of conductor bars.

2. The method of claim 1, further comprising the steps of:
    positioning separate inner and outer concentric rings of a second end ring at the second end of the lamination stack over a second end of each of the plurality of conductor bars, the second end ring defining a plurality of openings and each opening of the plurality of openings configured to receive a corresponding conductor bar of the plurality of conductor bars, the inner concentric ring of the second end ring defining a radially outer surface and a first portion of each opening of the plurality of openings in the second end ring and the outer concentric ring of the second end ring defining a radially inner surface and a second portion of each opening of the plurality of openings in the second end ring, the radially outer surface of the inner concentric ring of the second end ring configured to abut the radially inner surface of the outer concentric ring of the second end ring; and joining the inner and outer concentric rings of the second end ring to one another and to each of the plurality of conductor bars.

3. The method of claim 1 wherein the positioning step includes the substeps of:

moving the inner concentric ring of the first end ring axially relative to the plurality of conductor bars such that each conductor bar of the plurality of conductor bars is located within the first portion of a corresponding opening of the plurality of openings in the first end ring; and moving the outer concentric ring of the first end ring axially relative to the plurality of conductor bars such that each conductor bar of the plurality of conductor bars is located within the second portion of the corresponding opening of the plurality of openings in the first end ring and the radially inner surface of the outer concentric ring abuts the radially outer surface of the inner concentric ring.

4. The method of claim 1 wherein the joining step includes brazing the inner and outer concentric rings to one another and to each of the plurality of conductor bars.

5. The method of claim 4 wherein the brazing step includes:

placing a filler material on an axial end surface of the first end ring proximate the intersection of the radially outer surface of the inner concentric ring and the radially inner surface of the outer concentric ring; and applying heat to the axial end surface of the first end ring.

6. The method of claim 1 wherein the joining step includes welding the inner and outer concentric rings to one another and to each of the plurality of conductor bars.

7. The method of claim 6 wherein the welding comprising friction stir welding.

8. The method of claim 1, further comprising the steps of:

forming the inner and outer concentric rings;

broaching the inner concentric ring to form the first portion of each opening of the plurality of openings; and, broaching the outer concentric ring to form the second portion of each opening of the plurality of openings.

* * * * *